US007818242B1

(12) United States Patent
Lee et al.

(10) Patent No.: US 7,818,242 B1
(45) Date of Patent: Oct. 19, 2010

(54) SYSTEM AND METHOD FOR PRICING DEFAULT INSURANCE

(75) Inventors: Shinghoi Lee, West Windsor, CT (US); Peter Cotton, New York, NY (US); Zhifeng Zhang, Princeton Junction, NJ (US); Kin Pang, London (GB)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 12/822,927

(22) Filed: Jun. 24, 2010

Related U.S. Application Data (63) Continuation of application No. 10/274,536, filed on Oct. 17, 2002, now Pat. No. 7,774,255.

(60) Provisional application No. 60/340,306, filed on Dec. 14, 2001.

(51) Int. Cl.
*G06Q 40/00* (2006.01)

(52) U.S. Cl. .................. 705/36 R; 705/35; 705/37; 705/38; 706/50

(58) Field of Classification Search .......... 705/35, 705/36 R, 37, 38; 706/50
See application file for complete search history.

(56) References Cited

U.S. PATENT DOCUMENTS

| | | | | |
|---|---|---|---|---|
| 5,692,233 A * | 11/1997 | Garman | ..................... | 705/36 R |
| 5,774,881 A * | 6/1998 | Friend et al. | ............... | 705/36 R |
| 5,812,988 A * | 9/1998 | Sandretto | .................. | 705/36 R |
| 5,940,810 A * | 8/1999 | Traub et al. | ................ | 705/36 R |
| 6,055,517 A * | 4/2000 | Friend et al. | ............... | 705/36 R |
| 6,061,662 A * | 5/2000 | Makivic | .................... | 705/36 R |
| 6,078,903 A * | 6/2000 | Kealhofer | .................. | 705/36 R |
| 6,085,175 A * | 7/2000 | Gugel et al. | ............... | 705/36 R |
| 6,173,276 B1 * | 1/2001 | Kant et al. | ..................... | 706/50 |
| 6,219,650 B1 * | 4/2001 | Friend et al. | ............... | 705/36 R |
| 6,647,374 B2 * | 11/2003 | Kansal | ........................ | 705/37 |
| 7,028,007 B1 * | 4/2006 | Abrahams et al. | ............ | 705/38 |
| 7,089,207 B1 * | 8/2006 | Lardy et al. | ................... | 705/38 |
| 7,333,950 B2 * | 2/2008 | Shidler et al. | ................. | 705/35 |
| 7,392,216 B1 * | 6/2008 | Palmgren et al. | ............. | 705/37 |
| 2002/0042770 A1 | 4/2002 | Slyke et al. | | |
| 2003/0093347 A1 * | 5/2003 | Gray | ........................... | 705/35 |
| 2005/0262013 A1 * | 11/2005 | Guthner et al. | ............... | 705/38 |

OTHER PUBLICATIONS

L. Scott, "A Note on the Pricing of Default Swaps," Morgan Stanley Dean Witter Memorandum, Working Paper No. 7, Oct. 1998.

D. Duffie et al., "Modeling Term Structures of Defaultable Bonds," The Review of Financial Studies, Special 1999, vol. 12, No. 4, pp. 687-720.

RiskMetrics Group, Inc., Article entitled "CDO Manager," riskmetrics.com, May 2001.

(Continued)

*Primary Examiner*—Ella Colbert
*Assistant Examiner*—Sanjeev Malhotra
(74) *Attorney, Agent, or Firm*—Weitzman Law Offices, LLC (57) ABSTRACT

A system for modeling a basket of securities containing a plurality of securities is provided and includes a default/recovery model database for storing default/recovery data regarding the plurality of securities. Also included is a default simulation engine for calculating a default time for at least one of the plurality of securities based on the default/recovery data. Finally, a cash flow engine is included for generating cash flows for the basket of securities based on the default times.

43 Claims, 3 Drawing Sheets

OTHER PUBLICATIONS

RiskMetrics Group, Inc., Article entitled "Credit Manager," riskmetrics.com, May 2001.

RiskMetrics Group, Inc., Slide Presentation entitled "CDO Manager," May 2001.

RiskMetrics Group, Inc., Article entitled "CDO Manager".

RiskMetrics Group, Inc., Article entitled "Market Risk Solutions," 2001, pp. 1-9.

RiskMetrics Group, Inc., Article entitled "DataMetrics," 1999.

RiskMetrics Journal, vol. 2, No. 1, Spring 2001 (4 Articles).

RiskMetrics Group, Inc., Article entitled "CDO Manager Reports and Analytics," PTN Version 1.2, Mar. 16, 2000.

U. Erlenmaier, "Models of Joint Defaults in Credit Risk Management: An Assessment," Apr. 2001, pp. 1-45.

P. Schonbucher et al., "Copula-Dependent Default Risk in Intensity Models," Department of Statistics, Bonn University, Nov. 2000, pp. 1-23.

D. Duffie et al., "Transform Analysis and Asset Pricing for Affine Jump-Diffusions," Graduate School of Business, Stanford University, Nov. 26, 1997, pp. 1-45.

R. Jarrow et al., "A Markov Model for the Term Structure of Credit Risk Spreads," The Review of Financial Studies, Summer 1997, vol. 10, No. 2, pp. 481-523.

J. Hull et al., "Valuing Credit Default Swaps II: Modeling Default Correlations," Joseph L. Rotman School of Management, University of Toronto, Apr. 2000, pp. 1-26.

Risk Metrics—Technical Document, Part 1: Risk Measurement Framework, Fourth Edition, Dec. 1996.

K. Giesecke, "Correlated Default with Incomplete Information," Department of Economics Humboldt-Univesity—Berlin, Germany, Oct. 2, 2001, pp. 1-35.

D. Li, "On Default Correlation: A Copula Function Approach," The RiskMetrics Group, Working Paper No. 99-07, Sep. 1999.

Int'l Search Report for PCT/US02/39448 dated Mar. 9, 2004.

Preliminary Examination Search Report for PCT/US02/39448 dated Dec. 8, 2004.

* cited by examiner

SYSTEM AND METHOD FOR PRICING DEFAULT INSURANCE

CROSS REFERENCE TO RELATED APPLICATIONS

This application is a continuation application of U.S. patent application Ser. No. 10/274,536, entitled "System And Method For Pricing Default Insurance," which was filed on Oct. 17, 2002, which claims priority to U.S. provisional patent application No. 60/340,306 filed Dec. 14, 2001 and entitled "Basket Pricing Method And System." The content of both applications are herein incorporated by reference.

BACKGROUND

The following invention relates to a system and method for managing risk and, in particular, to a system and method for pricing default insurance for securities included in a basket of securities.

There are an increasing number of financial instruments that are used to manage the risk associated with various financial products. For example, many corporations and government agencies issue debt instruments that trade above or below standard benchmarks such as the London Interbank Offering Rate (LIBOR). Typically, a greater rate of interest above the LIBOR rate (i.e., spread) is paid to the corporate bond holder to compensate the owner against the risk of default by the issuer.

Various techniques may be used to protect the bond holder against this default risk. One such technique is to enter into a credit swap, also known as a default swap, in which the bond holder pays an insurance premium to an insurer in return for the right to "put" the bond to the insurer in case of a default event (for example, if the bond issuer fails to make coupon payments or files for bankruptcy). Thus, if a default occurs, the insurer must pay the bond holder an amount equal to the difference between the par value of the bond plus interest and the market value of the defaulted bond (typically well below par value). The insurance premium paid by the bond holder in a default swap is usually expressed as the difference between a risk-free benchmark yield (such as LIBOR) and the swap rate and is a good market indication of the credit-worthiness of the company issuing the bond.

Default insurance may also be purchased to protect against the default of any number of entities that are included in a basket of securities. Such a transaction, called a basket default swap, is similar to the default swap except that the insurance premium is paid by the buyer of insurance until a certain pre-specified number of entities in the basket have defaulted. For example, a buyer of "first to default" insurance in a basket of five entities receives default risk protection against a default of any one of the five issuers in the basket. The buyer may also purchase "second to default" insurance on the same basket in which case the buyer receives default protection in case a second issuer in the basket defaults. Similarly, the buyer may purchase insurance to protect against any other sequence of defaults that may occur. Basket default swaps are a common technique used to minimize the risk of default associated with owning Collateralized Bond Obligations (CBO's), Collateralized Debt Obligations (CDO's) and Collateralized Mortgage Obligations (CMO's) as well as other types of portfolios.

In order to determine the insurance premium amount sufficient to compensate a counterparty for taking on the risk of default of a given security contained in a basket of securities, it is necessary to calculate the probability of default for each security in the basket. Generally, the calculated default risk depends on the possibility of one or multiple defaults in the basket occurring, any change in the market perceived probabilities of defaults as well as other factors including, but not limited to, changes in interest rates, exchange rates, credit ratings or regulations and counterparty risk.

Prior art techniques exist for determining the times of defaults for securities contained in a basket of securities. In one technique attributed to Duffie and Singleton, (see Darrell Duffie and Kenneth Singleton, *Simulating Correlated Defaults*, Graduate School of Business, Stanford University, May 1999), a barrier (that is a random variable) for each name in the basket is selected so that all the barriers are independent and conform to an exponential distribution. Next, a hazard rate (a random variable that reflects the instantaneous probability of default) is identified for each name in the basket. The time of default for a given name is then calculated by integrating the hazard rate over time and determining at what time the integral becomes greater than the barrier. Because this process for finding default times incorporates the non-deterministic nature of a default occurring (as reflected in the randomness of the hazard rate and barrier), this approach results in an accurate prediction of default times for the particular securities. Because, however, both the barriers and the hazard rates are stochastic processes, this technique requires that computationally intensive simulations (such as Monte Carlo simulations) be performed to solve for the default times. As a result, calculating default times under this prior art approach is slow which renders this approach impractical in many applications such as, for example, calculating insurance premiums for default insurance to support real-time markets trading in baskets of securities.

Another prior art approach for determining the times of defaults for securities contained in a basket of securities is attributed to David Li, (see David Li, *On Default Correlation: A Copula Function Approach*, RiskMetrics, April 2000 (hereinafter "Li")), in which a copula function is directly used to determine the default times. The advantage of this approach is that because the copula function is deterministic, the need to run time-consuming simulations of hazard rates to calculate default times is eliminated and the computational speed of this approach is therefore increased. A drawback, however, of using this approach is that because the copula function does not explicitly take into account the correlation inherent in the hazard rates, the nature of the joint dynamics of spread movements of the entities in the basket is not accurately modeled, thereby resulting in decreased accuracy in the calculated default times.

Accordingly, it is desirable to provide a system and method for calculating the default times for entities in a basket of securities that is both accurate and computationally fast.

SUMMARY OF THE INVENTION

The present invention is directed to overcoming the drawbacks of the prior art. Under the present invention a method for calculating a default time for at least one of a plurality of securities contained in a basket of securities is provided and includes the step of identifying a plurality of hazard rates wherein one of the plurality of hazard rates corresponds to each of the plurality of securities. Next, a plurality of compensators is formulated wherein each of the plurality of compensators is based on said one of the plurality of hazard rates corresponding to each of the plurality of securities. The method also includes the steps of (a) selecting a plurality of barriers, one of the plurality of barriers corresponding to each of the plurality of securities; (b) determining a proposed default time for the at least one of the plurality of securities; (c) calculating a value of the compensator and the barrier corresponding to the at least one of the plurality of securities based on the proposed default time and (d) determining that the proposed default time is the default time for the at least one of the plurality of securities.

In an exemplary embodiment, the method includes the step of repeating steps (a)-(d) a plurality of times.

In an exemplary embodiment, the method includes the steps of calculating values of the plurality of hazard rates and the plurality of barriers calculated at time zero; forming a plurality of ratios wherein each of the plurality of ratios equals one of the plurality of barriers calculated at time zero divided by a corresponding one of the plurality of hazard rates calculated at time zero and selecting a smallest one of the plurality of ratios as the proposed default time.

In an exemplary embodiment, the method includes the steps of (e) calculating the compensator of the at least one of the plurality of securities and the barriers of the at least one of the plurality of securities using the proposed default time and (f) determining that the proposed default time is the default time if the compensator of the at least one of the plurality of securities calculated using the proposed default time is within a selected percentage of the barriers of at least one of the plurality of securities calculated using the proposed default time.

In an exemplary embodiment, if the compensator of at least one of the plurality of securities calculated using the proposed default time is not within a selected percentage of the barriers of at least one of the plurality of securities calculated using the proposed default time, the method includes the step of (g) calculating an adjustment to the proposed default time based on the compensator, the barrier and the hazard rate of the at least one of the plurality of securities.

In an exemplary embodiment, the method includes the step of repeating steps (e)-(g) until it is determined that the compensator of the at least one of the plurality of securities calculated using the proposed default time is within a selected percentage of the barriers of at least one of the plurality of securities calculated using the proposed default time.

In an exemplary embodiment, the method includes the step of repeating steps (e)-(g) until it is determined that the compensator of the at least one of the plurality of securities calculated using the proposed default time exceeds the barriers of at least one of the plurality of securities calculated using the proposed default time.

In an exemplary embodiment, the method includes the step of calculating the adjustment according to:

(B−H)/h wherein B is the barrier of the at least one of the plurality of securities evaluated at the proposed default time, H is the compensator of the at least one of the plurality of securities evaluated at the proposed default time and h is the hazard rate of the at least one of the plurality of securities evaluated at the proposed default time.

In an exemplary embodiment, the basket of securities has a time horizon and wherein the method includes the step of setting the proposed default time to the time horizon.

In an exemplary embodiment, the basket of securities has a time horizon and the method includes the step of setting the proposed default time as a fraction of the time horizon.

In an exemplary embodiment, the method includes the steps of (h) calculating the compensator of at least one of the plurality of securities and the barriers of at least one of the plurality of securities using the proposed default time and (i) determining that the proposed default time is the default time if the compensator of the at least one of the plurality of securities calculated using the proposed default time is in a relative relationship with the barriers of at least one of the plurality of securities calculated using the proposed default time.

In an exemplary embodiment, the relative relationship exists when the compensator of the at least one of the plurality of securities calculated using the proposed default time is within a selected percentage of the barriers of at least one of the plurality of securities calculated using the proposed default time.

In an exemplary embodiment, the relative relationship exists when the compensator of the at least one of the plurality of securities calculated using the proposed default time exceeds the barriers of at least one of the plurality of securities calculated using the proposed default time.

In an exemplary embodiment, if the compensator of at least one of the plurality of securities calculated using the proposed default time is not within a selected percentage of the barriers of the at least one of the plurality of securities calculated using the proposed default time, the method includes the steps of (j) incrementing the proposed default time by an additional fraction of the time horizon and repeating steps (h)-(j) until it is determined that the compensator of at least one of the plurality of securities calculated using the proposed default time is within a selected percentage of the barriers of at least one of the plurality of securities calculated using the proposed default time.

In an exemplary embodiment, each of the plurality of barriers is a random variable.

In an exemplary embodiment, the barriers are dependent.

In an exemplary embodiment, the dependence between the barriers is specified by a Copula function.

In an exemplary embodiment, the Copula function is gaussian.

In an exemplary embodiment, the method includes the steps of determining normally distributed random numbers $X\_k$ and setting the barriers $B\_k$ according to the formula $B\_k = -\log(1 - \text{invnormcdf}(X\_k))$.

In an exemplary embodiment, the method includes the step of randomly selecting each of the plurality of barriers.

In an exemplary embodiment, the method includes the step of selecting each of the plurality of barriers so that the plurality of barriers have an exponential distribution.

In an exemplary embodiment, each of the plurality of hazard rates is a random variable.

In an exemplary embodiment, each of the plurality of hazard rates is a stochastic process.

In an exemplary embodiment, the method includes the step of determining each one of the plurality of hazard rates for the corresponding one of the plurality of securities based on default swap prices for the corresponding one of the plurality of securities.

In an exemplary embodiment, the method includes the step of determining each one of the plurality of hazard rates for the corresponding one of the plurality of securities based on a bond rating for the corresponding one of the plurality of securities.

In an exemplary embodiment, the method includes the step of calibrating a specification of dependence between hazard rates based on correlation information.

In an exemplary embodiment, the method includes the step of calibrating the specification of dependence between barriers based on correlation information.

In an exemplary embodiment, the correlation information is based on historical time series of default swap.

In an exemplary embodiment, the correlation information is based on historical time series of bond spreads.

In an exemplary embodiment, the correlation information is based on historical time series of bond ratings.

In an exemplary embodiment, the correlation information is based on market prices of basket default swaps.

In an exemplary embodiment, the correlation information is based on option market pricing.

In an exemplary embodiment, the method includes the step of integrating each of the one of the plurality of hazard rates associated with the one of the plurality of compensators.

In an exemplary embodiment, the method includes the step of calculating an adjustment according to:

$$E(e^{-H(T^*)}) = e^{-B}$$

where T* is the estimated time, H is the at least one of the plurality of compensators and B is the corresponding one of the plurality of barriers.

In an exemplary embodiment, the method includes the steps of calculating the adjustment $T_{adj}$ according to:

$$T_{adj} = (B - H(T^*))/h$$

where T* is the previous proposed default time, H(T*) is the at least one of the plurality of compensators at the previously estimated time, B is the corresponding one of the plurality of barriers, and h is an estimate of the average or indicative value of the corresponding one of the hazard rates and forming a new proposed default time $T_{new}$ according to:

$$T_{new} = T^* + T_{adj}.$$

In an exemplary embodiment, the method includes the step of calculating the adjustment so that a portion of the plurality of compensators evaluated at the adjusted proposed default time are less than a corresponding portion of the plurality of barriers.

In an exemplary embodiment, the method includes the step of multiplying the estimated time by a multiplier.

In an exemplary embodiment, the method includes the step of calculating the value of the compensator based on a combination of the compensator and the one of the plurality of hazard rates associated with the compensator.

In an exemplary embodiment, the calculation involves interpolation.

In an exemplary embodiment, the calculation involves extrapolation.

In an exemplary embodiment, the method includes the steps of (k) calculating a calculated price for insuring against a default of the at least one of the plurality of securities at the default time; (l) deriving from a market a derived price for insuring against the default of the at least one of the plurality of securities and (m) adjusting a specification of dependence between barriers corresponding to the at least one of the plurality of securities based on the difference between the calculated price and the derived price.

In an exemplary embodiment, the method includes the step of repeating steps (k)-(m) a plurality of times.

In an exemplary embodiment, the plurality of times is greater than 5.

In an exemplary embodiment, the method includes the step of repeating steps (k)-(m) until the difference between the calculated price and the derived price is less than a specified tolerance.

In an exemplary embodiment, the method includes the step of calculating an insurance premium associated with a default of the at least one of a plurality of securities based on the default time.

In an exemplary embodiment, the method includes the steps of calculating a default time for each of the securities in the basket of securities and calculating cash flows associated with the basket of securities based on the default times.

In an exemplary embodiment, the method includes the steps of calculating a default time for each of the securities in the basket of securities and performing a valuation of the basket of securities based on the default times.

In an exemplary embodiment, the method includes the steps of calculating a default time for each of the securities in the basket of securities and performing a risk assessment on the basket of securities based on the default times.

Under the present invention, a system for modeling a basket of securities containing a plurality of securities is provided and includes a default/recovery model database for storing default/recovery data regarding the plurality of securities. Also included is a default simulation engine for calculating a default time for at least one of the plurality of securities based on the default/recovery data. Finally, a cash flow engine is included for generating cash flows for the basket of securities based on the default times.

In an exemplary embodiment, a valuation/pricing module is included for performing a valuation of the basket of securities based on the multiple scenarios.

In another exemplary embodiment, a risk assessment module is included for performing a risk assessment on the basket of securities based on the default times.

Accordingly, a method and system is provided for calculating the default times for entities in a basket of securities that is both accurate and computationally fast.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
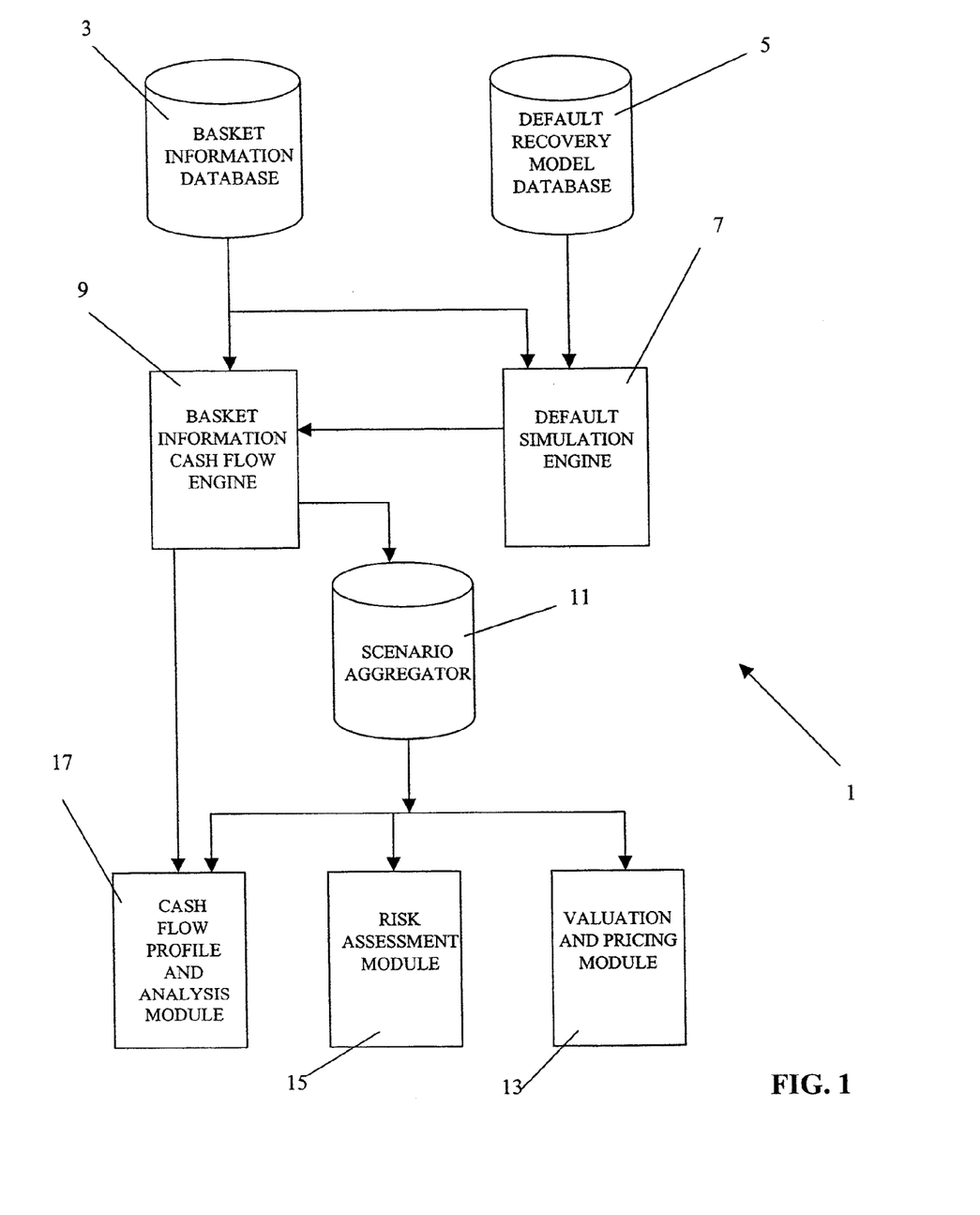
FIG. 1 is a block diagram of a system for pricing default insurance for a basket of securities in accordance with the present invention.

Referring now to FIG. 1, there is shown a system 1 for pricing default insurance for a basket of securities. System 1 includes a Basket Information Database 3 for storing information regarding each security contained in the portfolio of securities including, by way of non-limiting example, collateral portfolio information, capital structure information and waterfall information, both current and historical. The collateral portfolio information includes the indicatives (parameters) required to specify the securities in the portfolio, including, but not limited to, the name of each security, a security identifier (e.g., CUSIP), the issuer name, the maturity date, the coupon/spread (with coupon schedule if variable over time), the amortization schedule, the credit ratings and the industry sector. The capital structure information includes the data needed to specify the liabilities of the portfolio, such as the class of securities, seniority within the portfolio's capital structure, initial and current par amount, coupon/spread, maturity, initial and current credit ratings. Finally, the waterfall information includes data needed to accurately model the priority of payments within the portfolio, including information relating to the order of priority of principal and interest payments on the liabilities, hedge payments, redemption of the notes due to coverage test violations, reinvestment of proceeds into additional collateral and repayment of deferred interest.

System 1 also includes a Default/Recovery Model Database 5 that stores relevant default/recovery and correlation data for the securities in the portfolio. Default/recovery data may be obtained from any source including, by way of non-limiting example, historical sources (e.g., rating agencies) or market sources (e.g., credit default swap premia or cash trading spreads). Correlation data may be model-specific or based on assumed levels depending on industry sector, credit rating and any other security parameters. In a preferred embodiment, a single correlation parameter is adjusted until the price predicted by the simulation for a senior tranche of a basket default swap matches the available market price for the same tranche. In a preferred embodiment, several different correlation choices are made and the results of all cases are reported. Tabulated results for different correlation choices may be combined graphically or otherwise using standard methods of interpolation and extrapolation.

As an example of determining correlation data, assume the market price for a senior tranche is 30 bps (30 basis points=0.3%). The correlation parameter in the gaussian copula is set to 15% and 10,000 simulations of default scenarios (and cashflow calculations for the deal) are run. The average across the simulations yields a price for the senior tranche of 20 bps. Next, another batch of 10,000 simulations are run with a gaussian copula parameter of 17% that yields a price for the senior tranche of 40 bps. Based on these two simulation runs, it is concluded that the market implied correlation parameter is between 15% and 17%. Next, another batch of simulations is run with 16% correlation parameter resulting in a price for the senior tranche in between 20 bps and 40 bps. This process is repeated until a correlation parameter that yields a price for the senior tranche sufficiently close to (i.e., within a prescribed tolerance) the market price of 30 bps.

System 1 also includes a default simulation engine 7 that receives information from default/recovery model database 5 and basket information database 3 and, based thereon, calculates default timing for each security in the basket using a method that will now be described.

Figure 2:
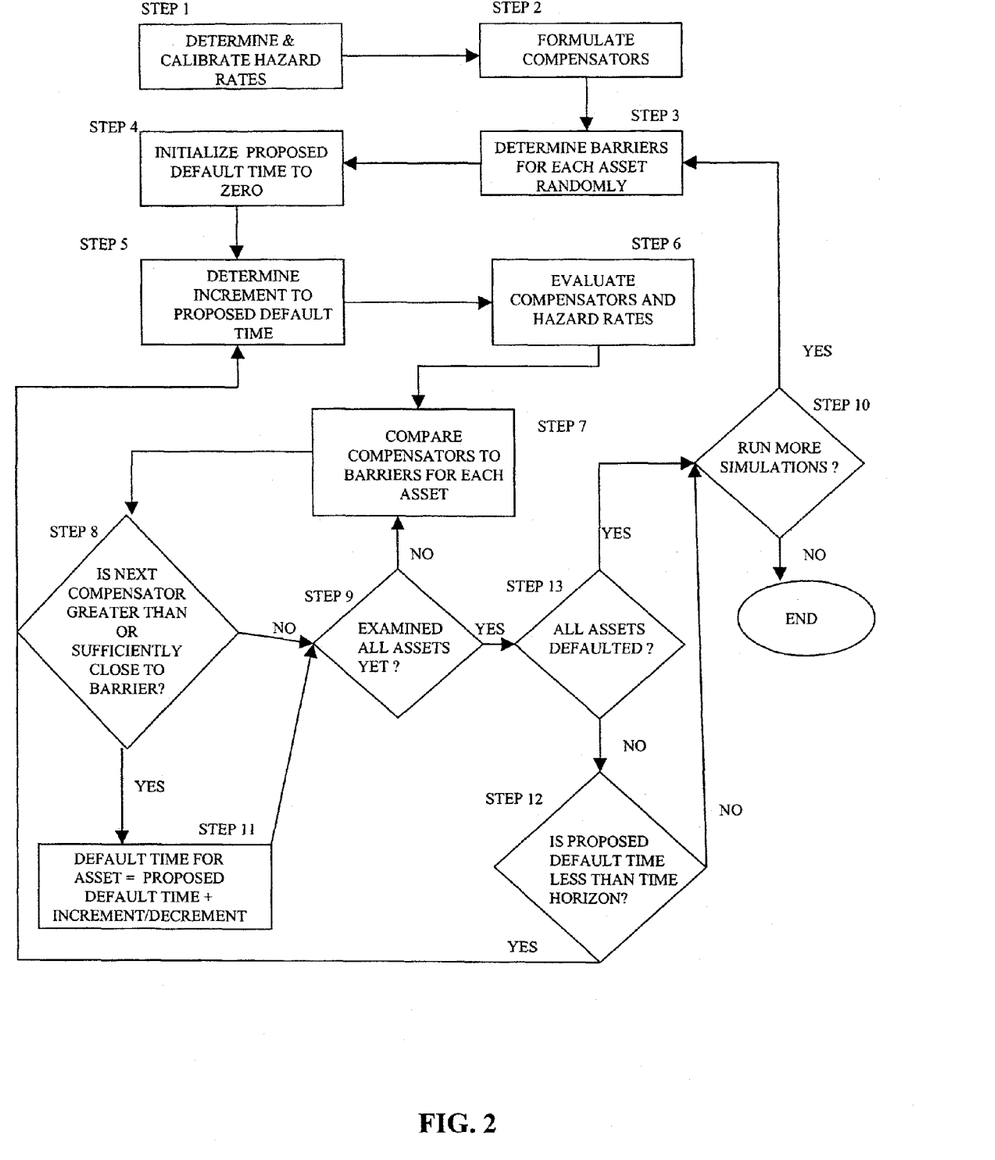
FIG. 2 is a flowchart of a method employed by the system of FIG. 1 for calculating a default time for a security contained in a basket of securities.

Referring now to FIG. 2, there is shown a flowchart of the method for calculating a default times for securities contained in a basket of securities. Initially, in Step 1, a hazard rate fore each of the securities in the basket is identified. The hazard rate for a particular security represents the instantaneous probability of default for that security. In an exemplary embodiment, the hazard rate for each of the securities is a stochastic process and is determined based on default swap prices for the particular security which default simulation engine 7 receives from default/recovery model database 5. Alternatively, the hazard rate for each of the securities is based on default bond ratings for the particular security which default simulation engine 7 receives from default/recovery model database 5.

In addition to specifying the hazard rates, the specification of dependence between hazard rates and between barriers is determined (which, together with the specification of hazard rates, corresponds to Step 1 of FIG. 2). The rationale for determining the dependence between the hazard rates and between the barriers is twofold. First, securities in the basket may have correlated spreads as estimated from historical time series that would result in their probabilities of default, embodied in their respective hazard rates, also being correlated. Second, it is beneficial to model the default of securities in the basket as dependent events. Introduction of correlation in the hazard rates may fail to introduce as much dependency in defaults as may be seen from historical studies or backed out from market prices.

In an exemplary embodiment, the spread correlation information is based on the bond rating information, default swap market pricing and/or option market pricing that default simulation engine 7 receives from default/recovery model database 5.

Next, in Step 2, a compensator is formed for each of the hazard rates that correspond to one of the securities in the basket by integrating each of the hazard rates so that:

$$H_i(t) = \int h_i(t) \tag{1}$$

where $h_i(t)$ is the hazard rate for the i-th security in the basket and $H_i(t)$ is the corresponding compensator.

Next, in Step 3, default simulation engine 7 selects a barrier for each of the securities in the basket. In an exemplary embodiment, each of the selected barriers is randomly drawn in such a way that, considered individually, the barriers conform to the exponential distribution (i.e., the joint distribution of barriers exhibits exponential marginals).

Appendix B describes the process for selecting barriers conforming to an exponential distribution according to an exemplary embodiment. In this exemplary embodiment, correlation is introduced in the random barriers. This method is more generally applicable because larger correlation can be induced in the times of default of securities in the basket. Larger correlation in defaults would appear to be implied by market prices for basket default swaps and similar products.

As discussed above, the time of default for a given security is calculated by determining the time when the compensator (the integral of the hazard rate over time) for the particular security becomes greater than the barrier corresponding to the security. The method for calculating the quantity for one or more assets in the portfolio is now described. The method improves over the prior art presented at Duffie and Singleton "Simulating Correlated Defaults, 1999" in which the same quantities are computed (using a slower algorithm).

To calculate the default time for a particular security in the basket, in Step 4 a proposed default time is set to zero.

Next, in Step 5, an increment for incrementing the proposed default times for the securities is derived. In one embodiment, the increment is determined as follows: for each asset divide the difference between its barrier and its compensator by its hazard rate. Then, the smallest resulting number is used as the increment to the proposed default time for all the assets. (The rationale for selecting the increment in this manner is that for a constant or approximately constant hazard rate h, the increment to the corresponding compensator H (which is the integral of h) is approximately equal to the increment in the proposed default time multiplied by h).

This method of incrementing the proposed default time is applied both for the first increment of the proposed default time (where the proposed default time is changed from zero to T*) and for subsequent increments. For example, for the first increment, the proposed default time T* may be determined by considering the times Ti for each asset i, that are estimates of when the respective compensators Hi will first exceed their respective barriers $B_i$. Based on equation (1) above, $H_i(T_i)=h_iT^*$ for a constant hazard rates. Thus, the times $T_i=B_i/h_i$ for each of the assets may be used as a guide for selecting the choice of T* for incrementing the proposed default time. In a preferred embodiment, the initial increment to the proposed default time is equal to the minimum of the $T_i$'s calculated for all the assets.

Subsequent increments of T* may be similarly calculated. In these subsequent calculations, increments to the compensators previously made are taken into account.

In a preferred embodiment, the increments $T_i=(B_i-H_i)/h_i$ are computed for each asset amongst those assets which have not already defaulted and the calculated increments are used to increment the previously calculated proposed default time for each asset, respectively.

In addition to this approach for determining an increment to the proposed default time, any other approach may be used. For example, in a case where the assets for which default times are being determined for a security basket having a maturity date (e.g., 7 years), the proposed default time may be set to the maturity date. In such a case, the method of determining the default time for each asset (as discussed below) reduces to whether each particular asset will default before the maturity date of the security basket. In another embodiment, the proposed default time for each asset is set at one of a plurality of fixed intervals between zero and the maturity date of the security basket. For example, if the maturity date is 7 years out, the increment to the proposed default time may be 1 year (and subsequent increments to the proposed default time may also be in one-year increments).

Once the proposed default time is incremented, in Step 6, the value of the compensator for the particular security (for which a default time is to be determined) are evaluated using the initial proposed default time. In an exemplary embodiment, the step of calculating a value for the compensator of a particular security includes the step of forming an array called $Z_t$ that is a combination of the compensator $H_t$ and hazard rate $h_t$ for the particular security. Where a default time for more than one of the securities in a basket is desired, the $Z_t$ includes the compensators $H_t$ and hazard rates $h_t$ for each of the securities. (Refer to Appendix A for a detailed description of the formation of $Z_t$.) By using $Z_t$, the speed at which the value of a compensator for a given default time is calculated is greatly improved.

Next, in Step 7, the compensator for each asset is compared to the corresponding barrier for each asset. In Step 8, it is determined whether the compensator for any of the assets is sufficiently close to or greater than the corresponding barrier. A compensator may be sufficiently close to a corresponding barrier if, for example, the compensator is within a certain percentage of the barrier (such as 5%). In an exemplary embodiment, the level of "closeness" deemed sufficient may be adjusted as desired. Alternatively, any other desirable measure of "closeness" may be used. If it determined that the compensator for a particular asset is sufficiently close to or greater than the corresponding barrier then, in Step 11, the proposed default time for which the compensator was found to be sufficiently close to or greater than the corresponding barrier is set as the default time for the particular asset. In an exemplary embodiment, an adjustment is made to this assigned default time that takes into account the difference between the barrier and compensator for the asset.

In an exemplary embodiment, the adjustment is made to be equal to an amount of time such that, were the compensator to be adjusted by that amount of time, the compensator would likely be equal to or close to the barrier. One simple calculation is to use the exact same calculation:

$$\text{time adjustment}=(B-H)/h$$

where the quantities {H=compensator, h=hazard rate} have been simulated at the proposed default time, and B is the barrier. In another exemplary embodiment, a time adjustment is selected so that the expected value of the exponential of the negative compensator at the adjusted time T=T*+adj is equal to the exponential of the negative barrier as defined by:

$$E[\exp(-H(T))]=\exp(-B)$$

Next, the process proceeds to Step 9 (either from Step 11 or from Step 8 if it is determined that the next compensator is not sufficiently close or greater than the corresponding barrier) in which it is checked whether all assets and compensators have been compared to their respective barriers. In an exemplary embodiment, in this step, certain assets are eliminated from further consideration, such as those assets having very large barriers.

If all the assets have not been considered, the process returns to Step 7 and the compensators are compared to the respective barriers for the remaining assets. Once all assets have been considered, the process proceeds to Step 13 in which it is determined whether all the assets have been assigned default times. If all assets have been assigned default times then the process proceeds to Step 10.

If there are remaining assets that have not been assigned default times, then the process proceeds to Step 12 in which a comparison of the proposed default time is made with a pre-specified time horizon. In a preferred embodiment, the horizon is equal to the deal maturity associated with the security basket. In another preferred embodiment, the horizon is some other time beyond which asset defaults are unimportant. If the proposed default time is already equal to or greater than the time horizon, then no further increment of the proposed default time is required and the process proceeds to Step 10.

If, on the other hand, the proposed default time is still less than the time horizon, then the process returns to step 5 and a further increment to the proposed default time is made.

At step 10, a decision is made as to whether further default scenarios are required. If so, the process proceeds to Step 3 in which new barriers for all the assets are determined.

As described above, in Step 11, adjustments to the proposed default time for the particular asset are calculated. These adjustments (either an increment or a decrement) may be calculated using any desirable method including, by way of non-limiting example, by calculating the adjustment as equal to:

$$(B_i-H_i)/h_i$$

where $B_i$ is the value of the barrier of the i-th asset previously calculated, $H_i$ is the value of the compensator of the i-th asset previously calculated and $h_i$ is the value of the hazard rate of the i-th asset previously calculated. If the compensator for a particular asset is greater than the corresponding barrier, then the amount calculated in Step 11 is a negative number (in which case the proposed default time is decremented). In an exemplary embodiment, the calculation to adjust the proposed default time performed in Step 11 is similar to the adjustment to the proposed default time performed in Step 5 (and vice-versa). In an exemplary embodiment, the results of calculations performed in Steps 5 and 11 may be stored so as to avoid repetition of calculations, where applicable.

In another exemplary embodiment, the adjusted proposed default time T may be determined according to the following:

$$E(e^{-H(T)})=e^{-B}$$

where T is the adjusted proposed default time, H is one of the plurality of compensators and B is the corresponding barrier. The left-hand side of this equation is a conditional expectation that may be calculated by one of ordinary skill in the art using well known bond pricing formulas or lookup tables. The advantage of calculating the adjusted default time in this manner is that it increases the accuracy of the simulation and it facilitates comparison with other known default simulation techniques such as shown by Li.

A numerical example of the method of FIG. 2 will now be provided. Assume a basket of three assets having a time horizon of 7 years; hazard rates $h\_1$, $h\_2$ and $h\_3$ and corresponding compensators $H\_1$, $H\_2$ and $H\_3$ for the three assets respectively; and the random barriers $B\_1$, $B\_2$ and $B\_3$ corresponding to the three assets in which $B\_1=1.4$, $B\_2=0.8$ and $B\_{\_3}=1.2$.

Initially, the proposed default time is initialized to zero (Step 4) and an increment to the proposed default time is determined. In this example the increment is determined by first evaluating each of the hazard rates at time zero and then dividing the barriers for each of the assets by the corresponding hazard rates. In this case, at time zero, $h\_1=0.1$, $h\_2=0.2$ and $h\_3=0.4$ and the barrier-hazard rate ratios are as follows:

$$B\_1/h\_1=14$$

$$B\_2/h\_2=4$$

$$B\_3/h\_3=3$$

Based on the calculated ratios, the first increment to the proposed default time is 3—the smallest calculated ratio. (Alternatively, the first increment to the proposed default time may be slightly less than 3 in order to improve the accuracy of the simulation).

Next, the compensators and hazard rates for the assets are calculated based on the incremented proposed default time. The process of calculating the value of the compensators and hazard rates includes forming a vector Z:

$$Z(T^*=3)=[h\_1(3)h\_2(3)h\_3(3)H\_1(3)H\_2(3)H\_3(3)]$$

whose distribution as a random variable is known. In a preferred embodiment, the vector is drawn using the mathematics described in Appendix A. For example, the vector may be drawn as:

$$Z=[0.08, 0.20, 0.3, 0.25, 0.65, 1.3]$$

where the terms 0.08, 0.20, 0.3 are the result of simulating the hazard rates at the proposed default time $T^*=3$ and the terms 0.25, 0.65, 1.3 are the result of simulating the compensators at the proposed default time $T^*=3$.

Because no simulations are run for proposed times between time 0 (the initialized time) and time 3 (the first increment to the proposed default time), the method of the present invention is faster and more efficient than the prior art methods (discussed above) in which simulations would be performed for intermediate times between 0 and 3.

Next, as in Step 7, the compensators and barriers for each asset are compared. In this case, we have:

$$H\_1=0.25<B\_1=1.4$$

$$H\_2=0.65<B\_2=0.8$$

$$H\_3=1.3>B\_3=1.2$$

Based on the above, because the compensators of the first two assets are less than the corresponding barriers, it is determined (in Step 8) that the first two assets did not default at the proposed default time of 3 while the third asset did default.

Next, in Step 11, an adjusted default time is calculated for each of the assets. For the third asset, the adjusted default time may be assigned by calculating the adjustment:

$$(B\_3-H\_3)/h\_3=(1.2-1.3)/0.3=-0.333 \text{ years}$$

In this case, the negative adjustment of 0.333 years reflects the overshoot of $H\_3>B\_3$ and results in an estimated default time for the third asset of $3.0-0.333=2.67$ years. The estimated default time of 2.67 years is set as the default time for the third asset because the estimated default time is less than the proposed default time $T^*=3$ years.

Next, we calculate adjustments for the first two assets as follows:

$$(B\_1-H\_1)/h\_1=(1.4-0.25)/0.08=14.375 \text{ years}$$

$$(B\_2-H\_2)/h\_2=(0.8-0.65))0.20=0.75 \text{ years}.$$

With respect to the second asset, therefore, the estimated default time is set to 3.75 years (3.0+0.75). Since the estimated default time is greater than the proposed default time, the estimated default time is evaluated to determine whether it is sufficiently precise to be designated as the default time for the second asset. If the estimated default time is deemed sufficiently close to the proposed default time, the default time for the second asset is set equal to the estimated default time for the second asset, 3.75 years.

With respect to the first asset, the estimated default time is 17.375 years which is not sufficiently close to the proposed default time of $T^*=3$ years.

In Step 12, the proposed default time of $T^*=3$ years is compared to the horizon $T=7$ years. Since it is less, the method returns to Step 5 in which the increment to the proposed default time is determined. The calculation for the first asset performed previously (the estimated default time of 17.375=3.0+14.375 years) may be reused. Since this is the only asset remaining, and since the estimate of 17.375 years is greater than the horizon of 7 years, the proposed default time is incremented from $T^*=3$ years to $T^*=7$ years. The process proceeds to Step 6 for a second time.

At Step 6, the increment to the compensator for the only remaining asset is calculated. We suppose for purpose of illustration that the compensator $H\_1$ is incremented from 0.25 to 0.53.

At Step 7, this new value for the compensator is compared to the barrier $B\_1=1.4$. Since the compensator 0.53 is still well less than the barrier 1.4, it is determined that the first asset has not defaulted before time $T=7$ years. In a preferred embodiment, an update of the estimated time of default may be computed. In another preferred embodiment, no default time is assigned for the first asset. Rather, the information that no default has occurred prior to the horizon is considered sufficient.

Figure 3:
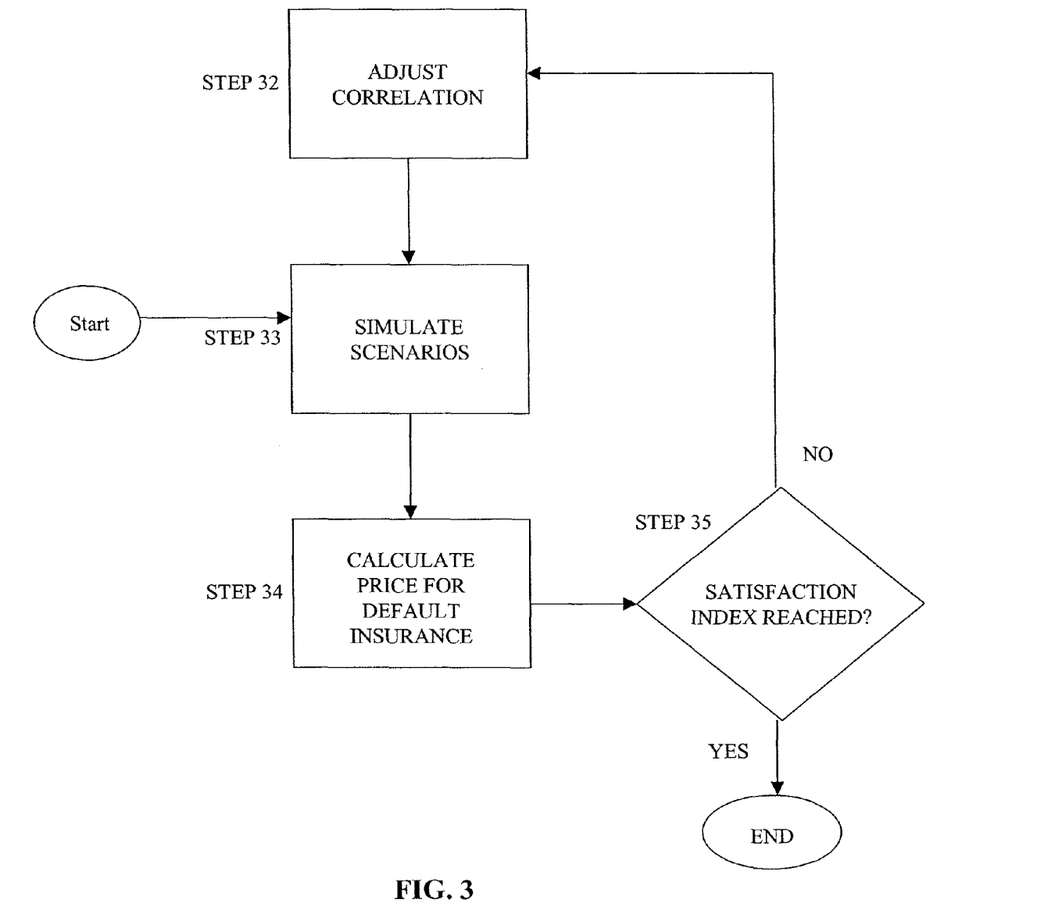
FIG. 3 is a flowchart of a process in which the default time for a particular security calculated by the method of FIG. 2 is further refined, according to an exemplary embodiment.

Referring now to FIG. 3, there is shown a flowchart describing an exemplary embodiment in which the dependency between barriers may be calibrated. Initially, in Step 33, multiple default scenarios are simulated. In Step 34 these scenarios are used to calculate the price of default insurance using techniques known to one of ordinary skill in the art, given prescribed default scenarios. Standard techniques for Monte Carlo simulation that are well-known may also be used.

In Step 35 it is determined whether the market (or otherwise obtained) price for the default insurance is within a prescribed tolerance of the price calculated using the simulated scenarios. In an exemplary embodiment, the prescribed tolerance is on the order of 0.1% of the market price for the default insurance. Alternatively, any other prescribed tolerance may be used as desired. If the market price for the default insurance is not within the prescribed tolerance of the calculated price, the process proceeds to Step 32.

At Step 32 the correlation is adjusted. This may be done manually or by any other method. Standard methods for adjusting the correlation will be apparent to one of ordinary skill in the art. In a preferred embodiment, a plurality of regressions are performed on subsets of all simulated default insurance prices in order to estimate one or more values of correlation which are likely to lead to passing of the satisfaction test in Step 35. In another preferred embodiment, standard spline techniques are used with the same objective in mind. The application of these and other techniques will be apparent to one of ordinary skill in the art.

Accordingly, a method for calculating a default time for any security included in a basket of securities is provided in which the limitations of the prior art methods are overcome. In particular, a method of performing simulations of default scenarios is provided in which the limitations of the prior art methods are overcome. Once the simulations are performed using the method of the present invention, the results of the simulation are used to calculate basket insurance pricing, implement risk management strategies and provide for other applications. The method of the present invention overcomes the deficiencies of the prior art in several respects. First, the method of the present invention is significantly faster than the prior art methods (such as the Duffie method described above) because the method of the present invention calculates the value of compensators and barriers by first estimating a proposed default time and then, via a recursive process, adjusting a proposed default time (that is derived from the estimated default time) until the proposed default time meets some confidence measure. This generates default times far faster than the prior art techniques that use time-consuming simulations to determine the time a compensator for a particular security exceeds a corresponding barrier.

Furthermore, the speed performance of the method of the present invention is improved by forming $Z_t$ in order to calculate the value of a particular compensator, as described above.

The method of the present invention offers a speed improvement over the prior art for calculating default times on the order of one or more orders of magnitude. Thus, while the prior art techniques are too slow to be useful in supporting a real-time trading market, because the method of the present invention can calculate multiple scenarios (100,000 or more) in seconds, it is suitable for pricing default insurance for securities traded in a real-time market as well as other applications.

Furthermore, the method of the present invention overcomes the limitations of the prior art copula function approach attributed to Li. Whereas the Li approach sacrifices accuracy for computational speed by not taking into account the correlation information inherent in the hazard rates, the method of the present invention is sensitive to the correlation information inherent in the hazard rates and therefore generates more accurate default times than the Li approach.

Furthermore, the present invention takes into account the stochastic nature of hazard rates and default swap spreads. It may be used in a manner consistent with the pricing of spread sensitive instruments, providing for a more unified risk management across different products.

Furthermore, the present invention permits estimation of the dependency between hazard rates to be estimated or calibrated in a deal-independent manner, with subsequent calibration of the barrier dependence performed on a deal by deal (basket by basket) basis. Other estimation and calibration options made available by the present invention will be apparent to one of ordinary skill in the art based on the description above.

System 1 also includes a basket information cash flow engine 9 that receives the collateral, capital structure and waterfall information for a basket of securities from basket information database 3 and receives from default simulation engine 7 the calculated default times for the securities for generating collateral and liability cash flows for each security and combination of securities in the basket. The cash flow details generated by cash flow engine 9 for each scenario, together with any related calculated quantities resulting from the calculations (e.g., average lives, yields, net present values, and amortization profiles) are then stored in a scenario aggregator 11 included in system 1. In an exemplary embodiment, scenario aggregator 11 computes direct statistics on the data stored therein such as, by way of non-limiting example, means, standard deviations, minima and maxima. Cashflow calculations required for financial products such as basket default swaps are well known and include calculation of present values, adherence to certain day count conventions and other contractual details.

Once the various scenarios have been run and the related cash flows are stored in scenario aggregator 11, the stored data may then be analyzed and synthesized. In an exemplary embodiment, system 1 includes a cash flow profile/analysis module 17 that receives the data stored in scenario aggregator 11 and computes based thereon cash flow economics for the portfolio including, by way of non-limiting example, the average life, duration, convexity, yield/spread, principal window and any related statistical measures such as mean and standard deviation across a distribution of outcomes. In another exemplary embodiment, system 1 includes a risk assessment module 15 that receives the data stored in scenario aggregator 11 and computes based thereon various risk measures such as, by way of non-limiting example, the variance of returns, return-to-risk measures (e.g., Sharpe ratio) and risk-adjusted returns. In another exemplary embodiment, system 1 includes a valuation/pricing module 13 that receives the data stored in scenario aggregator 11 and applies to such data any desired valuation techniques (e.g., net present value) for valuing the portfolio or any portion thereof.

Accordingly, a system is provided that incorporates an accurate and computationally feasible method for calculating a default time for any security included in a portfolio of securities for simulating and analyzing the cash flows associated with the portfolio. The system of the present invention may be applied to any type of portfolio of securities including, by way of non-limiting example, CBOs, CDOs and CMOs (collectively "CDOs"). Thus, an integrated CDO modeling system is provided for (a) modeling a given collateral portfolio for an arbitrary CDO, (b) sampling a dynamic range of scenario outcomes with respect to default rates and timing, recovery rates and interest rates applied to the portfolio, (c) generating a distribution of collateral and CDO liability cash flows for each simulated scenario and (d) analyzing the economics, risk and valuation of the CDO.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Computers and network access devices can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

APPENDIX A

The following is an example of a method of determining the random vector of quantities Z appearing in the proposed method for simulating default times. Recall that the vector Z encapsulates information on the hazard rates $h_1, \ldots, h_n$ and also the compensators $H_1, \ldots, H_n$. We recall also that barriers $B_1, \ldots, B_n$ are assigned to each of the n securities. We recall times of default for securities in the basket are calculated by comparing the compensators $H_1, \ldots, H_n$ to the barriers $B_1, \ldots B_n$. We recall that in the prior art, the calculation of compensators $H_1, \ldots, H_n$ requires a computationally expensive two stage algorithm where one first simulates hazard rates $h_1, \ldots, h_n$. We now demonstrate a method for determining the hazard rates $h_1, \ldots, h_n$ and compensators $H_1, \ldots, H_n$ simultaneously and rapidly.

To provide context, we briefly describe a particular mathematical specification of a popular stochastic process that can be used to model a hazard rate for a security. We consider a hazard rate h(t) is modeled as in the Vasicek interest rate model *An Equilibrium Characterization of the Term Structure*, Journal of Financial Economics 5 (1977), 177-188]. The hazard rate h(t) is described by the stochastic differential equation:

$$dh(t)=a(b-h(t))dt+sdW\_t \quad (2)$$

This equation is essentially a mathematical way of assigning a probability to all the possible future trajectories of the hazard rate. There is little we can say about the future trajectory with certainty. However, it is highly likely that the hazard rate will display a tendency to revert to a certain level (the level is equal to the quantity b in the equation). The amount by which the hazard rate is randomly bounced around by the "noise" dW_t is proportional to the quantity s. The strength of the pull back toward the level b is proportional to the quantity a. The typical distance that the hazard rate tends to wander away from the level b before being pulled back in is one of many quantities which may be calculated using the theory of stochastic differential equations.

Many variations on the model described above may be used. In particular, the constants a, b and s may be replaced by functions of time, functions of the hazard rate and/or functions of some other random process.

We now turn to an example of describing not one but many hazard rate processes and their relationships. As in the case of modeling a single process, other examples, following the prescription below, may be used by one of ordinary skill in the art and applied to the method for determining default times described herein.

For illustration, we consider a particular multivariate version of the Vasicek model. We illustrate the procedure by assuming three securities. We assume three hazard rates h=[h_1 h_2 h_3] obey the stochastic differential equation:

$$dh(t)=A(B-h(t))dt+SdW\_t \quad (3)$$

This equation is formally similar to the stochastic differential equation (2). However, here h(t) is a vector h(t)=[h_1(t), h_2(t), h_3(t)], A is a 3 by 3 matrix, B is a 3 by 1 vector, S is a 3 by 3 matrix and the noise dW_t is also three dimensional. We note that the hazard rates will be correlated when the matrix S contains non-zero, off-diagonal elements.

Our procedure determines, at some future time t, the value of the vector Z(t)=[h_1(t), h_2(t), h_3(t), H_1(t), H_2(t), H_3(t)]. We take a novel approach by considering Z(t), rather than h(t) or H(t) individually. The prescription for determining Z(t), applicable across many different specifications of hazard rate dynamics, is:

1. Calculate the first and second moments (the mean, and the covariance) of Z(t) according to well known procedures detailed in, for example, (see Karatzas and Shreve, *Brownian Motion and Stochastic Calculus*, Springer Verlag 2nd Edition, 1991, page 354 and continuing]. Methods for calculating or estimating the moments for other examples are suggested by an extensive literature on stochastic processes and may be applied by those of ordinary skill in the art.

2. Once the mean and covariance of Z(t)—(or alternatively, the mean and correlation of Z(t)) have been computed, we may proceed to determine (i.e., simulate) Z(t) by standard means (as in Tong, "The Multivariate Normal Distribution" Springer Verlag, 1990 (hereinafter "Tong")) for the simulation of gaussian random variables and approximations thereof. In particular, we may exploit special structures in the correlation matrix for Z(t), and in a preferred embodiment, the correlation between hazard rates h(t) is the same as the correlation between integrated hazard rates H(t).

It will be a routine task for one of ordinary skill in the art to carry out this process and required calculations. However, in order to exhibit a particularly concrete implementation we now further specialize to a case where it is assumed that the correlation between h_i(t) and h_j(t) is given by the formula:

$$C(i,j) = \Lambda(i,1)\Lambda(j,1) + \Lambda(i,2)\Lambda(j,2) \quad (4)$$

This special example is motivated by a "factor" philosophy. Here the quantities $\Lambda(l,k)$ relate the k-th hazard rate to the l-th "factor". There may be a relatively small number of factors which are assumed responsible for all correlations between a large number of securities. This is a very standard technique previously applied to interest rate models. Factors are themselves stochastic processes, or random variables. Here we assume two factors driving the correlation between three securities.

For the example hazard rate process h(t) described in (3), with correlation matrix S consistent with equation (4), we then have the following algorithm for determining the vector Z(t), whose generalization to the case of more than two factors will be apparent to one of ordinary skill in the art:

1. Simulate independent random variables F_1, F_2, G_1, G_2, H_1, H_2, L_1, L_2, L_3, M_1, M_2, M_3, N_1, N_2, N_3 from the normal distribution with mean zero and variance one.
2. For i=1, 2, 3, calculate $R\_i = \sqrt{[1-\Lambda(i,1)^2 - \Lambda(i,2)^2]}$.
3. For i=1, 2, 3, calculate X_i=$\Lambda(i,1)$ F_1+$\Lambda(i,2)$ F_2+R_i L_i
4. For i=1, 2, 3, calculate Y_i=$\Lambda(i,1)$ G_1+$\Lambda(i,2)$ G_2+R_i M_i
5. For i=1, 2, 3, calculate Z_i=$\Lambda(i,1)$ H_1+$\Lambda(i,2)$ H_2+R_i N_i
6. For i=1, 2, 3, calculate h_i(t)=E(h_i(t))+V(h_i(t)) [X_i$\sqrt{Q}$+Y_i $\sqrt{(1-Q)}$]
7. For i=1, 2, 3, calculate H_i(t)=E(H_i(t))+V(H_i(t))[X_i $\sqrt{Q}$+Z_i $\sqrt{(1-Q)}$]
8. If necessary, collate: Z(t)=[h_1(t), h_2(t), h_3(t), H_1(t), H_2(t), H_3(t)]

In the above procedure, Q is a quantity obtained from the covariance matrix of the Z(t) process. The quantities E(h_i(t)), V(h_i(t)), E(H_i(t)) and V(H_i(t)) are the means and variances of the I-th hazard rate and compensator respectively, with the latter also obtained from the covariance matrix of the Z(t) process. These quantities are readily calculated by one of ordinary skill in the art. A formula for the covariance of the solution of a linear stochastic differential equation is presented in *Brownian Motion and Stochastic Calculus*, at page 357 and is adequate for the present example. Furthermore, application of methods for estimating the moments of stochastic processes, in the context of the process described herein, should be readily apparent to one of ordinary skill in the art.

The process described above is readily adapted to CIR and other affine processes or combinations thereof, and other descriptions of the hazard rate process for which a moment generating function (of Z(t)) is known or calculated. It will also be obvious to one of ordinary skill in the art, that an adaptation of the procedure is possible for models where the integrated hazard rate (or equivalently, a survival function) covariance is known or estimated but the covariance of Z(t) is not. In this context standard results (such as central limit theorems for stochastic processes) may be used to estimate or reduce the error induced by approximation of the integrated hazard rate by gaussian processes.

APPENDIX B

The following is an example of a method of determining random correlated barriers for n assets. Initially, n random barriers $B_1, \ldots, B_k, \ldots B_n$ are generated in accordance with a gaussian Copula and conforming individually to the exponential distribution with mean 1, according to well known techniques. For example, one may first generate correlated variables $X_1, \ldots, X_n$ conforming to a multivariate normal distribution with mean zero and a specified covariance matrix. This step may be achieved in the general case using a Cholesky decomposition of the correlation matrix, or by more efficient methods known to work for special cases (for example, see Tong). Next, for each barrier, we set $$B\_k = -\log(1 - invnormcdf(X\_k))$$

where invnormcdf( ) is the inverse normal cumulative distribution. The result is a set of barriers having an exponential distribution.

What is claimed is:

1. A system for calculating default times for securities contained in a basket of securities, comprising:
   one or more computer processors; and
   memory comprising program instructions, wherein the program instructions are executable by at least one of said one or more processors to:
   (a) determine, with at least one of said one or more computer processors, for each of said securities, a hazard rate that is a stochastic process that represents the instantaneous probability of default for a corresponding one of said securities, wherein said hazard rates are correlated;
   (b) determine, with at least one of said one or more computer processors, for each of said securities, a compensator based on integrating the hazard rate associated with the corresponding one of said securities over time;
   (c) determine, with at least one of said one or more computer processors, for each of said securities, a barrier value selected according to a multivariate distribution of barriers with exponential marginals, thereby establishing random correlated barriers;
   (d) determine, with at least one of said one or more computer processors, a proposed default time increment value;
   (e) determine, with at least one of said one or more computer processors, a current proposed default time by adjusting a prior proposed default time based on the proposed default time increment value;
   (f) calculate, with at least one of said one or more computer processors, for each of a plurality of said securities, a compensator value of said compensator associated with said corresponding security at said current proposed default time;
   (g) determine, with at least one of said one or more computer processors, for each of said plurality of securities, whether said corresponding compensator value is in a relative relationship with said corresponding barrier value, and if so assigning a default time to said corresponding security based on said current proposed default time; and (h) repeat steps (d)-(g) at least with respect to one or more unassigned securities.

2. The system of claim 1, wherein said at least one of said one or more computer processors determines random correlated barriers by at least:
determining normally distributed random numbers X_k; and
setting the barriers B_k according to the formula B_k=−log(1−invnormcdf(X_k)).

3. The system of claim 1, wherein said at least one of said one or more computer processors determines a hazard rate for each of said securities by at least calibrating a specification of dependence between hazard rates based on correlation information.

4. The system of claim 3, wherein said correlation information is based on historical time series of default swap.

5. The system of claim 3, wherein said correlation information is based on historical time series of bond spreads.

6. The system of claim 3, wherein said correlation information is based on historical time series of bond ratings.

7. The system of claim 3, wherein said correlation information is based on market prices of basket default swaps.

8. The system of claim 3, wherein said correlation information is based on option market pricing.

9. The system of claim 1, wherein said prior proposed default time comprises an initialized proposed default time and said initialized proposed default time is set to zero.

10. The system of claim 1, wherein said at least one of said one or more computer processors determines said proposed default time increment value based on calculating, for each of said plurality of said securities, a value based at least on said barrier value and said compensator associated with said corresponding one of said plurality of said securities.

11. The system of claim 10, wherein said at least one of said one or more computer processors determines said proposed default time increment value by at least selecting a smallest value of said values and basing said proposed default time increment value on said smallest value.

12. The system of claim 1, wherein said at least one of said one or more computer processors determines said proposed default time increment value based on calculating, for each of said plurality of said securities, a value based at least on said barrier value and said hazard rate associated with said corresponding one of said plurality of said securities.

13. The system of claim 12, wherein said value is a ratio of said barrier value and said hazard rate at time zero.

14. The system of claim 1, wherein said at least one of said one or more computer processors determines said proposed default time increment value based at least on selecting a smallest value of said values and basing said proposed default time increment value on said smallest value.

15. The system of claim 1, wherein the program instructions are further executable by the at least one of said one or more computer processors to calculate, for each of a plurality of said securities, a hazard rate value of said compensator associated with said corresponding one of said plurality of said securities at said current proposed default time.

16. The system of claim 15, wherein said at least one of said one or more computer processors determines said proposed default time increment value by at least calculating, for each of said plurality of said securities, a value based at least on said barrier value, said compensator, and said hazard rate associated with said corresponding one of said plurality of said securities.

17. The system of claim 16, wherein said value is a ratio of a difference of said barrier value and said compensator value to said hazard rate value.

18. The system of claim 17, wherein said at least one of said one or more computer processors determines said proposed default time increment value by at least selecting a smallest value of said values and basing said proposed default time increment value on said smallest value.

19. The system of claim 15, wherein assigning a default time to said corresponding security based on said current proposed default time comprises adjusting said current proposed default time based on a ratio of a difference of said barrier value and said compensator value to said hazard rate value, for said corresponding security.

20. The system of claim 1, wherein assigning a default time to said corresponding security based on said current proposed default time comprises adjusting said current proposed default time based on a time adjustment selected so that the expected value of the exponential of the negative of said compensator at an adjusted time is equal to the exponential of the negative of the barrier value, wherein the adjusted time is said current proposed default time added to said time adjustment.

21. The system of claim 1, wherein the relative relationship comprises said corresponding compensator value is greater than said corresponding barrier value.

22. The system of claim 1, wherein the relative relationship comprises said corresponding compensator value is greater than or sufficiently close to said corresponding barrier value.

23. The system of claim 1, wherein the program instructions are further executable by at least one of said one or more processors to determine whether said corresponding compensator value is sufficiently close to said corresponding barrier value by determining whether said corresponding compensator value is within a selected percentage of said corresponding barrier value.

24. The system of claim 1, further comprising a cash flow engine that generates cash flows for said basket of securities based on said default times.

25. The system of claim 24, further comprising a basket information database that stores information for a basket of securities, wherein the basket information database is operatively connected to at least the cash flow engine to provide information for a basket of securities to the cash flow engine.

26. The system of claim 25, wherein the information for a basket of securities includes collateral, capital structure and waterfall information for a basket of securities.

27. The system of claim 24, further comprising a scenario aggregator that stores cash flows for said basket of securities generated by the cash flow engine and computing statistics based on the stored cash flows.

28. The system of claim 24, further comprising a valuation/pricing module that performs a valuation of said basket of securities based on said default time.

29. The system of claim 24, further comprising a risk assessment module that performs a risk assessment on said basket of securities based on said default times.

30. The system of claim 29, wherein said risk assessment module calculates an insurance premium associated with a default of said at least one of a plurality of securities based on said default time.

31. A system for calculating default times for securities contained in a basket of securities, comprising:
one or more computer processors; and
memory comprising program instructions, wherein the program instructions are executable by at least one of said one or more processors to:
(a) determine, with at least one of said one or more computer processors, for each of said securities, a hazard rate that is a stochastic process that represents the instantaneous probability of default for a corresponding one of said securities, wherein said hazard rates are correlated;

(b) determine, with at least one of said one or more computer processors, for each of said securities, a compensator based on integrating the hazard rate associated with the corresponding one of said securities over time;

(c) determine, with at least one of said one or more computer processors, for each of said securities, a barrier value selected according to a multivariate distribution of barriers with exponential marginals, thereby establishing random correlated barriers;

(d) determine, with at least one of said one or more computer processors, a proposed default time increment value;

(e) determine, with at least one of said one or more computer processors, a current proposed default time by adjusting a prior proposed default time based on the proposed default time increment value;

(f) calculate, with at least one of said one or more computer processors, for each of a plurality of said securities, a compensator value of said compensator associated with said corresponding security at said current proposed default time;

(g) determine, with at least one of said one or more computer processors, for each of said plurality of said securities, an adjusted default time based on said corresponding compensator and said corresponding barrier value, and determining, based on said adjusted default time, whether to assign a default time to said corresponding security, where said default time is based on said current proposed default time; and (h) repeat steps (d)-(g) at least with respect to one or more unassigned securities.

32. The system of claim 31, wherein said prior proposed default time comprises an initialized proposed default time and said initialized proposed default time is set to zero.

33. The system of claim 31, wherein the program instructions are further executable by at least one of said one or more processors to calculate, with at least one of said one or more computer processors, for each of a plurality of said securities, a hazard rate value of said compensator associated with said corresponding one of said plurality of said securities at said current proposed default time.

34. The system of claim 33, wherein said at least one of said one or more computer processors determines an adjusted default time by at least determining said adjusted default time based at least on said corresponding compensator value, said corresponding barrier value and said corresponding hazard rate value.

35. The system of claim 33, wherein said at least one of said one or more computer processors determines an adjusted default time by at least determining said adjusted default time based at least on a ratio of a difference of said barrier value and said compensator value to said hazard rate value, for said corresponding security.

36. The system of claim 31, wherein the program instructions are further executable by at least one of said one or more processors to assign the default time to said corresponding security, where said default time is based on adjusting said current proposed default time based on said adjusted default time of said corresponding security.

37. The system of claim 31, further comprising a cash flow engine that generates cash flows for said basket of securities based on said default times.

38. The system of claim 37, further comprising a basket information database that stores information for a basket of securities, wherein the basket information database is operatively connected to at least the cash flow engine to provide information for a basket of securities to the cash flow engine.

39. The system of claim 38, wherein the information for a basket of securities includes collateral, capital structure and waterfall information for a basket of securities.

40. The system of claim 37, further comprising a scenario aggregator that stores cash flows for said basket of securities generated by the cash flow engine and computing statistics based on the stored cash flows.

41. The system of claim 37, further comprising a valuation/pricing module that performs a valuation of said basket of securities based on said default time.

42. The system of claim 37, further comprising a risk assessment module that performs a risk assessment on said basket of securities based on said default times.

43. The system of claim 42, wherein said risk assessment module calculates an insurance premium associated with a default of said at least one of a plurality of securities based on said default time.

* * * * *